United States Patent Office.

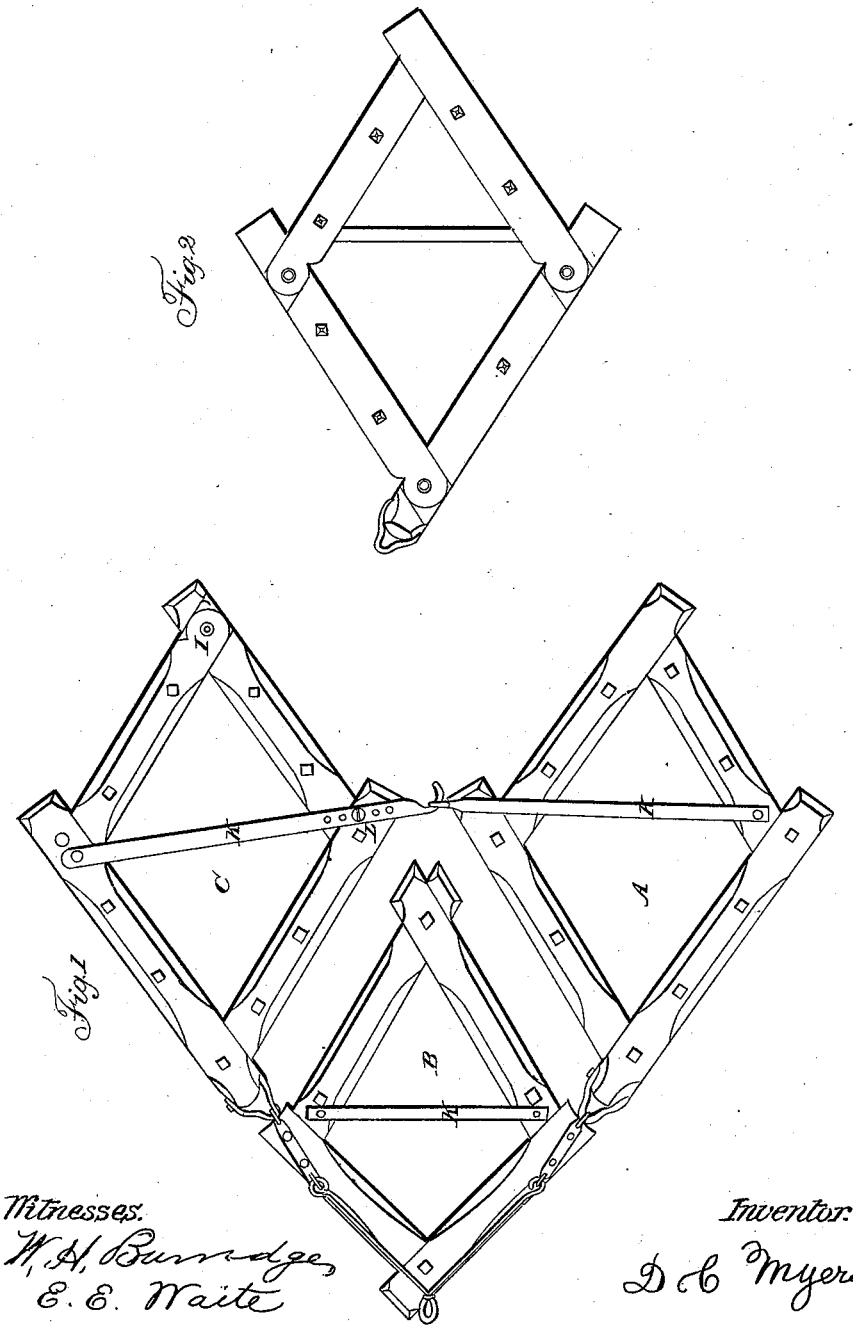

D. C. MYERS, OF SOUTH BEND, INDIANA.

Letters Patent No. 62,769, dated March 12, 1867.

IMPROVEMENT IN HARROWS.

*The Schedule referred to in these Letters Patent and making part of the same.*

TO ALL WHOM IT MAY CONCERN:

Be it known that I, D. C. MYERS, of South Bend, in the county of St. Joseph, and State of Indiana, have made certain new and useful Improvements in Field-Harrows; and I do hereby declare that the following is a full and complete description thereof, reference being had to the accompanying drawings, making a part of this specification, in which—

Figure 1 is a top view of the harrow.

Figure 2 is a detached section.

Like letters of reference refer to like parts in the different views.

This harrow is constructed in three sections, A B and C, fig. 1, which are arranged in relation to each other as shown in the drawing. D is the frame, E the teeth, F the links or rods by which the implement is drawn. G is a hook, by which the several sections are connected by the clevis H. The frames of these sections are so jointed as to permit of their being adjusted or spread out so as to make the gang of harrows wider, and therefore harrow a wider space of ground at once or be contracted in width, as the case may require. The peculiar construction of these joints is shown in fig. 2, in which it will be seen that it consists of the circular end I pivoted in a gain, J, in which it works for the purpose above said. The joints of the frame can be made rigid, if so desired, and the sections then used as arranged in the same order. K K are stay-braces, by the means of which the several sections are secured when adjusted to any degree required, which is done by taking out the screw or pin L and inserting it in another hole nearer or further from the end of the stay-brace, as the case may be, and thus changing the position of the teeth in relation to each other so as to harrow fine or coarse, as the nature of the work may demand, or to harrow different widths of ground as above said.

What I claim as my invention, and desire to secure by Letters Patent, is—

The arrangement of the series of angular-jointed harrows A B C, with their respective braces and connections, when constructed and combined as and for the purpose set forth.

D. C. MYERS.

Witnesses:
R. GARRETT,
C. SHERMAN.